April 4, 1961

G. L. FERNSLER 2,978,655

AUTOMATIC ALIGNMENT SYSTEM

Filed Oct. 1, 1957

INVENTOR
GEORGE L. FERNSLER
By W. H. Sprungle
ATTORNEY

April 4, 1961

G. L. FERNSLER 2,978,655

AUTOMATIC ALIGNMENT SYSTEM

Filed Oct. 1, 1957

INVENTOR.
GEORGE L. FERNSLER
BY
*ATTORNEY*

April 4, 1961

G. L. FERNSLER 2,978,655

AUTOMATIC ALIGNMENT SYSTEM

Filed Oct. 1, 1957

INVENTOR.
GEORGE L. FERNSLER
BY
*ATTORNEY*

April 4, 1961 G. L. FERNSLER 2,978,655
AUTOMATIC ALIGNMENT SYSTEM
Filed Oct. 1, 1957 6 Sheets-Sheet 5
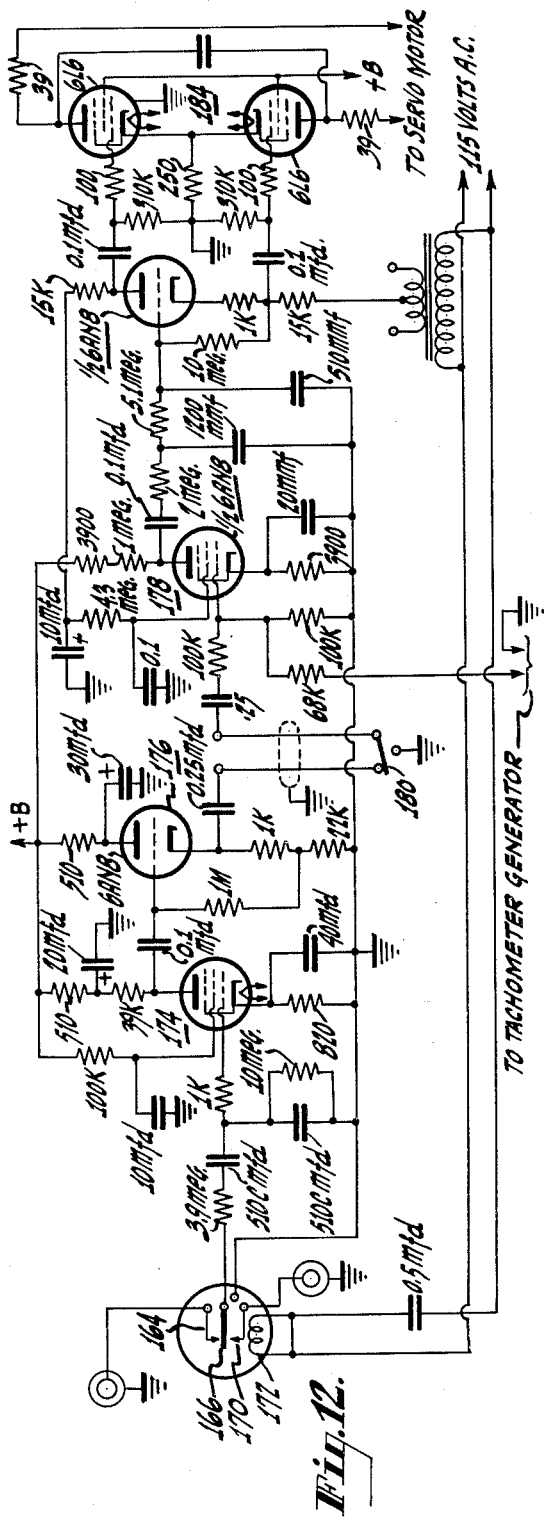
Fig. 12.
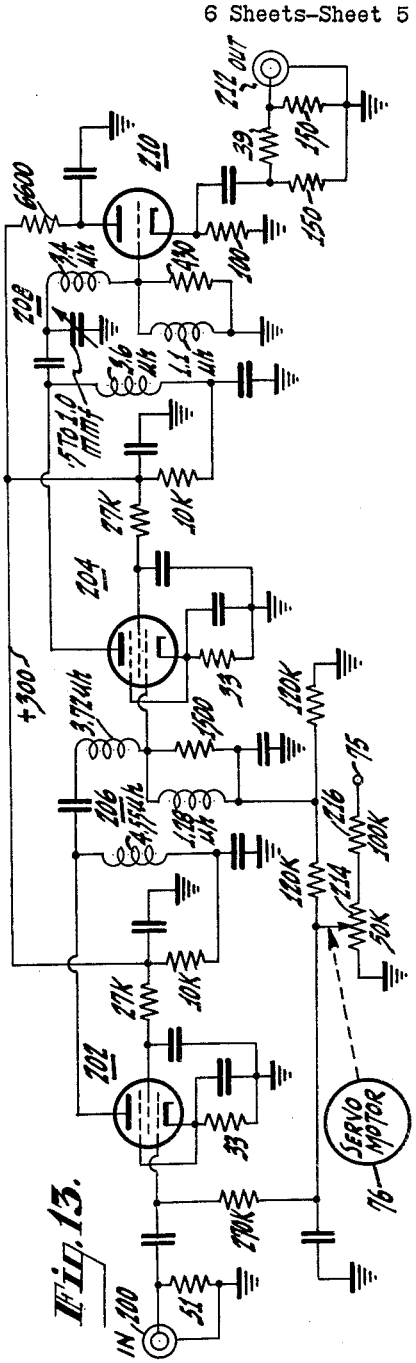
Fig. 13.
INVENTOR.
GEORGE L. FERNSLER
BY
Attorney April 4, 1961 G. L. FERNSLER 2,978,655
AUTOMATIC ALIGNMENT SYSTEM
Filed Oct. 1, 1957 6 Sheets-Sheet 6

INVENTOR.
GEORGE L. FERNSLER
BY
ATTORNEY

United States Patent Office 2,978,655
Patented Apr. 4, 1961

2,978,655

AUTOMATIC ALIGNMENT SYSTEM

George L. Fernsler, Norristown, Pa., assignor to Radio Corporation of America, a corporation of Delaware Filed Oct. 1, 1957, Ser. No. 687,578

2 Claims. (Cl. 333—17)

The present invention relates to an alignment system for automatically aligning electric circuits, and more particularly to an improved system which accurately and quickly tunes resonant circuits to a predetermined frequency response characteristic.

In many instances, it is necessary to align an electrical circuit to a predetermined frequency. For example, radio and television receivers which are now being produced in great volume include a number of resonant circuits which must be tuned to the correct operating frequencies. Generally, the alignment of such resonant circuits has been performed manually by trained operators. Each operator views the response of each resonant circuit on an oscilloscope, or on an indicating meter, and manually tunes the resonant circuit to the correct frequency as indicated by a maximum or peak response of the resonant circuit. Such an alignment procedure is inherently laborious and time consuming and requires skilled personnel to manipulate the test equipment and interpret the data obtained. While a human operator can align a single resonant circuit with good accuracy and in a relatively short period of time, when he attempts to align resonant circuits one after the other, he is unable to operate with any acceptable speed or accuracy over long periods of time. Consequently, when tunable circuits are aligned manually, the results are non-uniform.

Automatic alignment apparatus has been provided for tuning a single resonant circuit to a predetermined resonant frequency by observing the peak response of the circuit when excited by a signal of the predetermined frequency. However, the procedures used are not satisfactory for applications such as multi-stage stagger-tuned or overcoupled amplifiers, wherein interstage coupling transformers are tuned to provide an overall predetermined frequency response characteristic for the amplifier. This is particularly true of television receiver picture I.F. amplifiers wherein the frequency response characteristic must be accurately controlled to obtain optimum transient responses and to prevent undesired interaction between the sound and picture signals.

It is, therefore, desirable to have a fully automatic alignment system wherein the resonant circuits can be accurately, reliably, and uniformly aligned to provide the correct frequency response characteristic. Also, it is desirable to decrease the time required to tune each circuit to the correct frequency response characteristic without employing highly skilled technicians, so that more receivers can be tuned in a given period of time and the expense of operating personnel can be reduced.

In one approach to the provision of automatic alignment apparatus the frequency response of apparatus including a plurality of tunable circuits to be aligned is sequentially sampled at different selected signal frequencies of substantially constant amplitude. The response of the apparatus at each of the selected signal frequencies is compared with standard or reference signals representative of the desired output level of the apparatus at the particular frequency sampled. Any difference between the measured level and that of the standard is used to control a servo system connected to automatically adjust the tuning elements of the resonant circuits. In this manner a stagger-tuned amplifier such as used in radio or television receivers can be quickly and accurately adjusted to a predetermined frequency response characteristic. However, it has been found that this approach is not entirely suitable for automatically tuning certain types of circuits such as composite passive networks since the tuning of one element in the network affects the tuning of all other elements. Such networks may, for example, comprise the overcoupled stage commonly used between the tuner and first I.F. amplifier of a television receiver.

It is accordingly an object of this invention to provide a new and improved apparatus for automatically aligning electric circuits to predetermined frequencies.

It is a still further object of this invention to provide an improved automatic alignment apparatus for aligning electric circuits such as composite passive networks to a predetermined frequency response characteristic wherein such alignment may be accomplished by unskilled operators in a minimum amount of time on a production line basis and with a high degree of uniformity of the aligned circuits.

In accordance with the invention a first of the tunable elements of a composite passive network which has been manually tuned to provide a specified frequency response characteristic is completely detuned. The resulting frequency response with this element detuned establishes a criterion for the individual tuning thereof. As a second step, a second tuning element is completely detuned. The frequency response with the first and second tuning elements detuned establishes a criterion for the individual tuning of the second tuning element. The same procedure may be applied to the third, fourth, etc. tuning elements successively. The final criterion is established when all of the controls are detuned to some extreme condition. The various criteria which are established are applicable to composite passive networks of the same design and hence the automatic tuning system to be described is applicable on a mass production basis.

Assuming four tunable elements in the passive network, a total of six basic steps may be used to tune the network to the specified frequency response characteristic. After the apparatus including the passive network is properly connected electrically and mechanically in the automatic alignment apparatus, the first step may be to simultaneously run out all of the tuning controls to some extreme position. The second step is to automatically tune the fourth tuning element to produce the frequency response characteristic noted when the first, second and third tuning elements were detuned. The third step is to automatically tune the third tuning element to produce the frequency response characteristic when the first and second tuning elements were detuned. Similarly, in the fourth and fifth steps, the second and first tuning elements are automatically adjusted. In the sixth step all or some of the tuning elements are simultaneously adjusted to provide a simultaneous solution meeting the overall response specification. In each step except the first, the output of the receiver is maintained constant with respect to some frequency established in the criterion for that step.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 9–14 are detailed schematic circuit diagrams of portions of the automatic alignment system of Figure 1.

Figure 1:
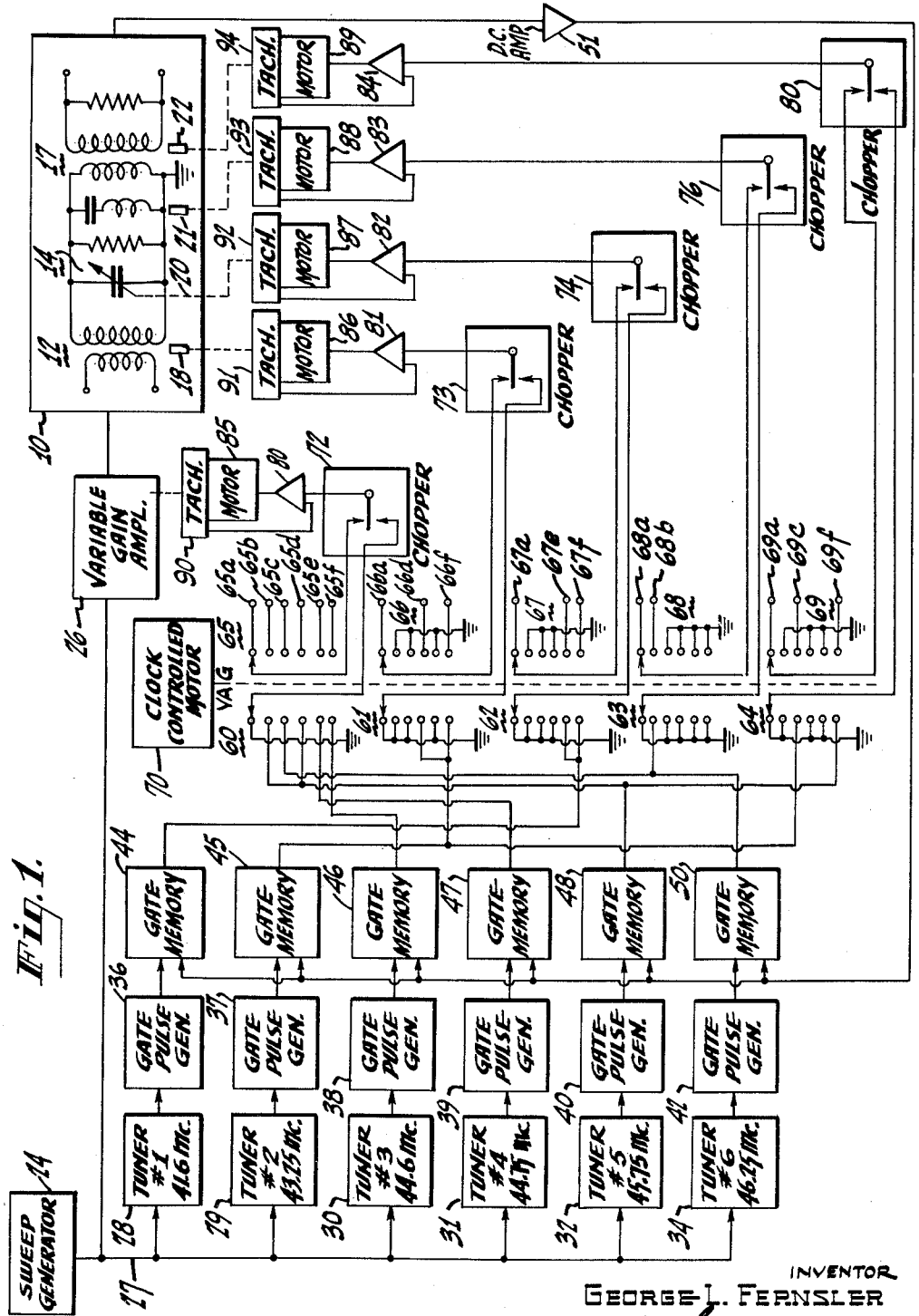
Figure 1 is a schematic circuit diagram in block form of an automatic alignment system in accordance with the invention.

Referring now to the drawings and more particularly to Figure 1 thereof, there is illustrated in block diagram form one alignment system embodying the present invention which is capable of accurately aligning cascaded resonant circuits to provide a predetermined frequency response characteristic on a fully automatic basis.

Before considering the details of the system, it is pointed out generally that corresponding reference characters have been used throughout the drawings to identify corresponding circuit elements of the system. It is also pointed out that while single conductors have been illustrated as interconnecting the units shown in block diagram form in Figure 1, all the units are connected to common ground potential indicated in each of the detailed schematic circuit diagrams.

Figure 3:
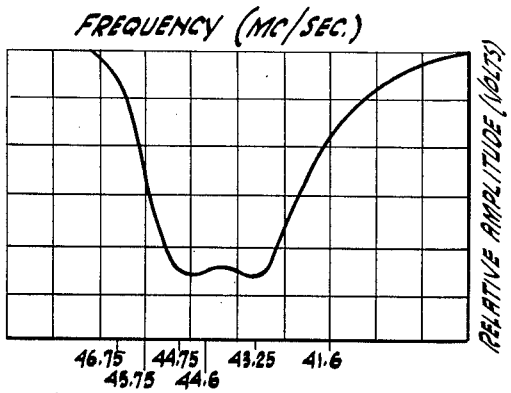
Figure 3 is a graph of a desired frequency vs. amplitude characteristic for the composite passive tuned network shown in Figure 2.

The automatic alignment system is shown in connection with a modulated carrier wave receiver, such as a television receiver, indicated generally at 10, having an overcoupled stage such as a composite passive network which is to be aligned to provide a predetermined frequency response characteristic such as that shown in Figure 3. The passive network of the receiver 10 is indicated as having at least four tunable components, the transformer 12, the variable capacitor 14, the variable inductor 16, and the tunable transformer 17 which are individually tunable to a desired frequency of resonance by the movable tuning elements 18, 20, 21 and 22 respectively.

It has been found that the tunable elements of a composite passive network of the type illustrated may not be simultaneously tuned from a completely detuned condition to produce the desired frequency response characteristic since the tuning of one element affects the tuning of all other elements. Accordingly, the alignment of this circuit in the receiver 10 is affected by sequentially tuning the four tunable elements 12, 14, 16 and 17 in a predetermined manner to approximately the desired final frequency response. The tunable elements 12, 14 and 17 are then simultaneously tuned to provide the exact desired overall frequency response curve.

Figure 5:
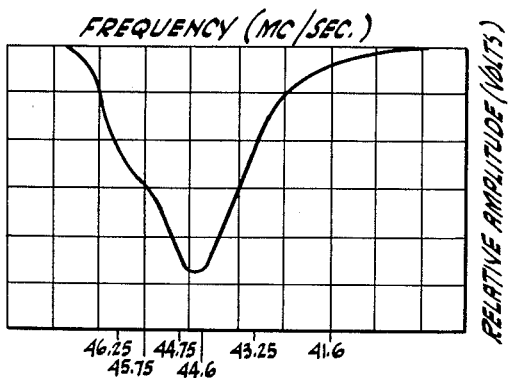

To establish a criterion by which the tunable elements may be sequentially tuned automatically to approximately produce the desired response characteristic for the overcoupled circuit, these elements are sequentially detuned, and the resulting frequency response characteristics are observed. The graph of Figure 3 illustrates an example of a desired specified frequency response characteristic curve to which a completely tuned composite passive network may be tuned. In the first step, the variable capacitor 14 is completely detuned producing the frequency response characteristic shown in Figure 5. This establishes a criterion for the individual tuning of the capacitor 14. It can be seen from Figure 5 that the response of the overcoupled network when the capacitor 14 is detuned falls off near the low end of the band. Furthermore, even with the capacitor 14 detuned, Figure 5 shows that the response remains at about the desired relative level in the vicinity of 44.75 megacycles.

Figure 6:
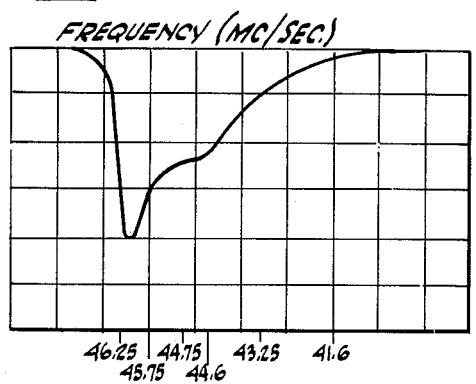

In like manner when the transformer 12 is completely detuned the frequency response characteristic shown in Figure 6 is produced. This causes a noticeable drop of response in the vicinity of 43.25 megacycles, but the relative response at 45.75 megacycles changes very little.

Figure 7:
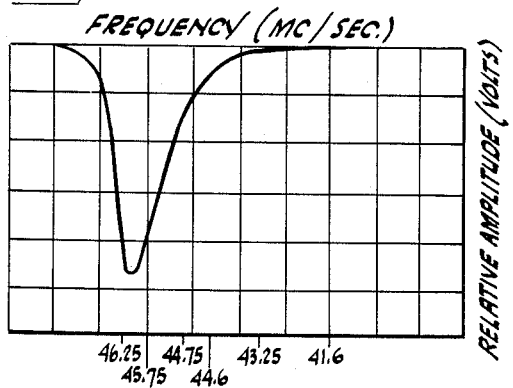

In the next step the transformer 17 is detuned to the minimum inductance position, and the resulting frequency response characteristic is shown in Figure 7. This establishes the criterion for the tuning of the transformer 17. The greatest effect of the detuning of the transformer 17 occurs in the vicinity of 43.25 megacycles and the least effect occurs near the high frequency end of the band near 46.25 megacycles.

Figure 8:
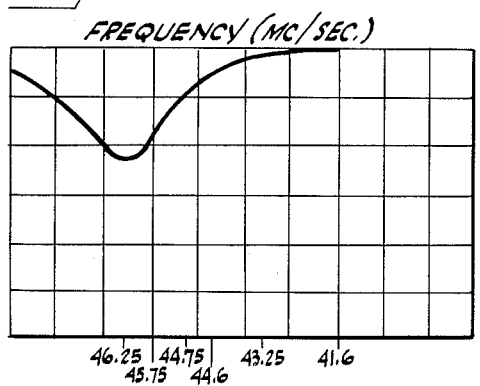

To establish the final criterion the inductor 16 is completely detuned with the resulting frequency response characteristic of the overcoupled stage shown in Figure 8. As can be observed from Figure 8 the response between 46.25 and 45.75 megacycles drops off sharply.

To automatically align the composite passive circuit, this procedure is reversed. Assuming all of the tuning controls to be initially at the minimum inductance or capacitance position, the inductor 16 is tuned to produce the response shown in Figure 7. To accomplish this, the response of the overcoupled network at 46.25 megacycles is compared with the desired output when the inductor 16 was properly tuned and the other three elements were completely detuned.

This comparison is used to provide an error signal for a servo loop which controls the tuning of the inductor 16. A second servo loop compares the response of the overcoupled network at 45.75 megacycles with a reference potential corresponding to the response of the network when the inductor 16 is tuned but the other three elements are detuned. The second servo loop is connected to control the gain of a variable gain amplifier 26 which operates to maintain the signal output level from the overcoupled stage constant at 45.75 megacycles as the inductor 16 is tuned, for reasons explained hereinafter.

In the next step the transformer 17 is tuned to produce a response shown in Figure 6. Accordingly, the response of the overcoupled network at 43.25 megacycles where the response was most seriously affected by the detuning of transformer 17 is compared with the desired output level of the overcoupled network when the transformer 17 is properly tuned, but the capacitor 14 and the transformer 12 are completely detuned. During this step, the response of the overcoupled network at 46.25 megacycles where the response was relatively unchanged by the detuning of transformer 17 is compared with a reference potential corresponding to the desired response of the circuit at 46.25 megacycles when the inductor 16 and the transformer 17 were tuned and the transformer 12 and the capacitor 14 were completely detuned.

In like manner, the transformer 12 and capacitor 14 are sequentially tuned. For tuning the transformer 12 the response of the overcoupled stage at 43.25 megacycles is compared with a reference potential corresponding to the desired response at this frequency, while the signal output is maintained constant at 45.75 megacycles. In a similar manner, the response of the overcoupled stage at 41.6 megacycles is compared with a reference potential corresponding to the desired response for the completely tuned network during the tuning of the capacitor 14, and the signal output level is maintained constant at 41.6 megacycles.

Figure 4:
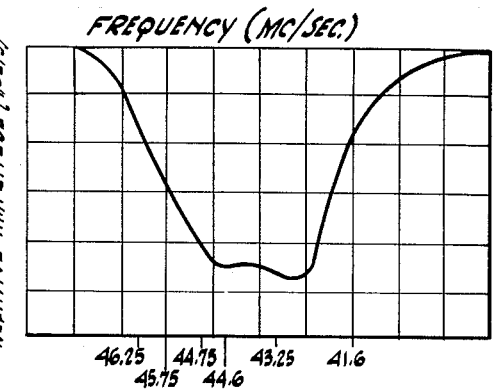
Figures 4–8 are graphs of the resulting frequency response characteristics of the passive tuned network when the tuning elements are successively detuned.

At the completion of the sequential tuning of the elements 12, 14, 16 and 17 a response curve similar to that shown in Figure 4 is derived. It can be seen that this response differs slightly from the desired overall overcoupled stage adjustment shown in Figure 3. Accordingly, the transformer 12, capacitor 14 and transformer 17 are simultaneously adjusted to obtain a simultaneous solution which meets the overall response specification. In this step of the alignment procedure the actual response of the overcoupled stage at 43.25 megacycles is compared with a reference potential corresponding to the desired relative response of the stage at this frequency to provide an error signal for the control of the tuning of the transformer 12. In like manner, the tuning of the capacitor 14 is controlled by deriving an error signal from the comparison of the response of the overcoupled stage at 41.6 megacycles with a reference potential corresponding to the desired response at the overcoupled response at this frequency. At the same time the response of the overcoupled stage at 43.25 megacycles is compared with a reference potential corresponding with a relative desired output at this frequency to produce an error signal for control of the transformer 17. The servo loop is so connected with the variable gain amplifier 26 to maintain the signal output amplitude from the overcoupled stage and receiver 10 constant at 44.6 megacycles.

As shown in Figure 1, five servo loops are provided for controlling the alignment of the receiver 10. A greater or lesser number of servo loops may be provided depending on the requirements of the particular system to be aligned. One servo loop adjusts the gain of the variable gain amplifier 26 and the other four servo loops are for controlling the tuning of the components 12, 14, 16 and 17. The servo loops are controlled in accordance with the response of the receiver 10 to different signal frequencies from the generator 24. The sampling frequencies are determined by which of the crystal tuners 28, 29, 30, 31, 32 and 34 are connected in the servo loops. The tuners 28, 29, 30, 31, 32 and 34 are tuned to 41.6 megacycles, 43.25 megacycles, 44.6 megacycles, 44.75 megacycles, 45.75 megacycles and 46.25 megacycles respectively. The selection of sampling frequencies is not critical and other frequencies could be used without departing from the scope of the invention. When the signal from the sweep frequency generator 24 passes through the frequency to which a tuner is responsive, an output pulse is produced.

Each of the tuners is connected in series with one of a bank of gate pulse generators 36, 37, 38, 39, 40 and 42 and gated memory circuits 44, 45, 46, 47, 48 and 50. The output signal from the receiver 10 is also applied to each of the memory circuits through a D.C. amplifier 51. The memory circuits do not accept information supplied by the receiver 10 except when triggered by the gate pulse generator connected therewith. The respective memory circuits are triggered in response to different signal frequencies applied to the receiver 10 to store signals representative of the receiver output at these different frequencies.

The output signal from the memory circuits 44, 45, 46, 47, 48 and 50 is a D.C. voltage representative of the output level of the receiver 10 at 41.6 megacycles, 43.25 megacycles, 44.6 megacycles, 44.75 megacycles, 45.75 megacycles, and 46.25 megacycles respectively. The output signals from the memory circuits are applied to one or more of the contacts of five switches 60, 61, 62, 63 and 64, one of which is connected in each of the five servo loops. The contacts of these switches which are not connected to the memory circuits are grounded. Fixed reference potentials are applied to certain contacts of five other switches 65, 66, 67, 68 and 69 with the remaining contacts being grounded. The ten switches 60-69 each have six contact positions, and are sequentially adjusted through these six positions by a clock-controlled motor 70.

Each of the five servo loops is provided with a chopping circuit 72, 73, 74, 76, and 78. The chopping circuits or choppers include a pair of stationary contact terminals, and a vibratory armature element. One of the stationary contact terminals in each of the chopping circuits 72, 73, 74, 76 and 78 is connected to the movable contact element of the switches 60-64 respectively, and the other terminal of the chopping circuits is connected to the movable contact element of the switches 65-69. The purpose of the chopping circuits is to compare the signal applied to the two stationary contact terminals to derive error signals which control the respective servo loops. To this end, the vibratory armature element alternately engages the stationary contact terminals to produce a square wave of an amplitude corresponding to the difference in output between the receivers 10 and the corresponding reference voltage, and of a frequency corresponding to the rate of vibration of the armature. This square wave is fed to a servo amplifier 80, 81, 82, 83 and 84, one for each servo loop, for amplification to control the servo motors 85, 86, 87, 88 and 89. In each of the switch 60-69 positions the information from the memory circuits is continuously available to at least one of the chopping circuits. Thus an error signal is available to provide continuous control of at least one of the motors during each stage of the alignment procedures.

The tachometer generators 90, 91, 92, 93 and 94 are coupled to the servo motors 85-89 respectively. The tachometer generator output signal is summed together with the amplified chopper signal. Thus the overall servo loop including the receiver 10 is a position servo while a velocity servo loop is obtained with the servo motor and amplifier. The amount of tachometer feedback used in each loop may be determined experimentally, and is adjusted to result in a fast and stable system, by providing a single overshoot unit step response.

It will be noted that the response of the receiver 10 at the various sampling frequencies is compared with fixed reference potentials. The gain of the signal channel including the overcoupled stage varies considerably during the alignment procedure. The overall response is usually specified in relative values, and it is necessary to maintain a fixed response at some frequency within the passband to be able to translate the relative measurements into fixed reference potentials. Thus during any one of the alignment steps the desired relative output of the receiver 10 at a selected frequency as represented by the reference potential applied to one of the terminals of the switches 65-69 is compared with the actual response of the receiver at the selected frequency and any difference produces an error signal which controls the gain of the amplifier 26. This in turn adjusts the signal amplitude applied to the receiver 10 in a direction so that the output signal amplitude more closely approaches that of the reference potential connected during the particular alignment step. In this manner the response of the receiver at other sampling frequencies can be adjusted to correspond to the other fixed reference potentials.

In considering the detailed circuitry of the system components briefly described above, the operation of these components will be analyzed insofar as possible in terms of the functions which they perform in tuning the resonant components 12, 14, 16 and 17 to provide substantially the same frequency response characteristic as established by the various reference potentials. Unless necessary to an understanding of the operation of a particular system component, those circuit elements which perform entirely conventional functions in the circuit, namely functions which will be readily understood by those skilled in the art, have not been identified by reference numerals in the drawings nor referred to in the following description of the system components.

Figure 2:
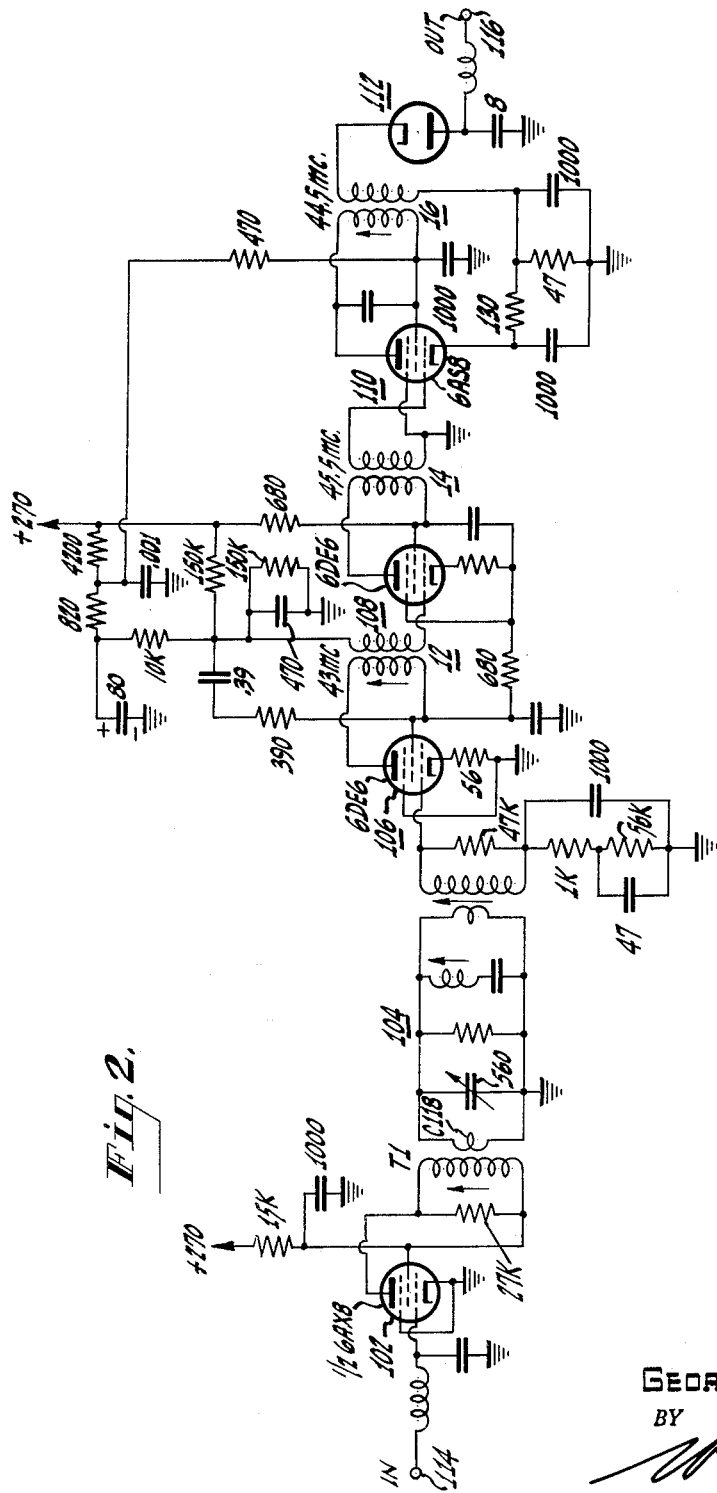
Figure 2 is a schematic circuit diagram of an intermediate frequency amplifier for television receivers including a composite passive tuned network which may be automatically aligned with the system of the present invention.

Figure 2 schematically illustrates a portion of a television receiver including a conventional composite passive network of the type which may be automatically aligned by means of the apparatus described above with reference to Figure 1. In addition to the passive network also referred to as the overcoupled stage, the schematic of Figure 2 shows the usual mixer stage 102 incorporated in superheterodyne receiver for converting a selected signal modulated radio frequency carrier to a corresponding intermediate frequency signal. The I.F. signal developed in the mixer output circuit is conveyed through an overcoupled passive network 104, to be aligned, to a stagger-tuned I.F. amplifier including three amplifier stages 106, 108 and 110 with tunable interstage coupling transformers. After amplification by the I.F. amplifier, the signal is detected in a rectifier circuit 112 connected to the secondary winding of the last I.F. transformer, which may comprise the video detector stage of the television receiver 10.

The signal from the sweep frequency generator 24 is applied through the variable gain amplifier 26 to the input terminal 114 which is coupled to the control grid of the mixer stage 102, and the amplifier output signal from the I.F. amplifier is derived from a terminal 116 which is coupled to the anode of the video detector. As pointed out above, one desired overall frequency response curve for the overcoupled stage is shown in Figure 3 with the signal injected at the terminal 114, and the I.F. amplifier completely detuned. In this curve the frequency of an applied signal of substantially constant amplitude is indicated along the abscissa and relative amplitude of the signal appearing at the output terminal 116 is indicated on the ordinate. As shown on this curve the passband of the overcoupled stage of Figure 2 extends over a range of frequencies from about 41 to 48 megacycles.

Figure 9:
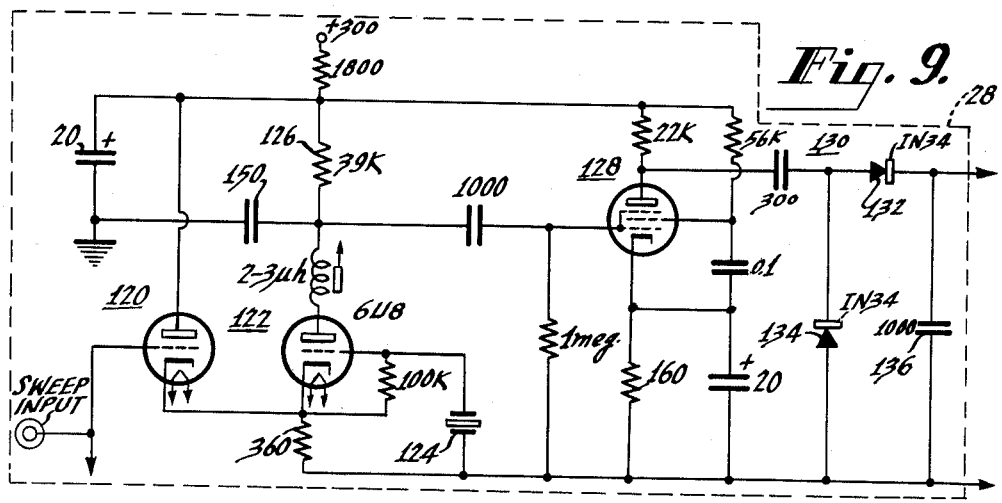

Since the construction of the six tuners 28, 29, 30, 31, 32 and 34 are similar, only the tuner 28 has been illustrated. Referring to Figure 9, the tuner 28 includes a cathode follower stage 120 the control grid circuit of which is connected to the sweep frequency generator 24. The cathode follower 120 which provides isolation from the other servo loops is cathode coupled to a self oscillating converter stage 122. The frequency of the oscillator portion of the converter stage 122 is controlled by a crystal 124 at 41.6 megacycles for the tuner 28. For the tuners 29, 30, 31, 32 and 34 the oscillator frequency should be 43.25, 44.6, 44.75, 45.75 and 46.25 megacycles respectively. Of the many resultant frequency components present in the plate current of the converter 122, one portion of interest is the difference frequency containing the zero beat which will appear across the plate load resistor 126. This beat burst is amplified by a pentode amplifier 128 which may for example comprise the pentode section of a 6U8 type tube.

The instantaneous value of the output voltage at zero beat can be of varying positive or negative amplitude depending upon the relative phase of the two mixed signals. This provides an envelope whose desired positive half has an irregular peak amplitude. Accordingly, this signal is fed through a half wave doubler 130 including the rectifiers 132 and 134, so that each negative half cycle is added to each succeeding positive half cycle. The resulting transformed envelope is detected by an output capacitor 136, and is used to key the gate pulse generator 36.

Figure 10:
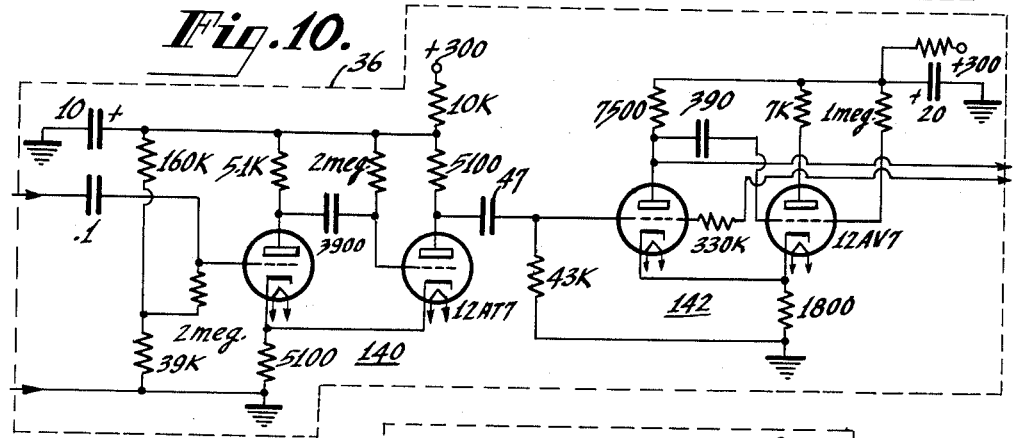

The gate pulse generator 36 as shown in Figure 10 comprises a cathode coupled univibrator 140. To avoid multiple triggering by an input pulse the delay of the univibrator is made appreciably longer than the trigger pulse from the tuner 28. The level at which the univibrator 140 may be triggered can be varied by altering the grid bias on the input stage thereof.

The ouput from the univibrator 140 is differentiated to provide a sharp trigger pulse for a gating univibrator 142. The time delay of the gating univibrator 142 is adjusted to give a gate width of sufficient duration to permit proper operation of the memory circuit 44. Gating pulses of opposite polarity are available from the anode circuits of the tubes comprising the univibrator 142.

Figure 11:
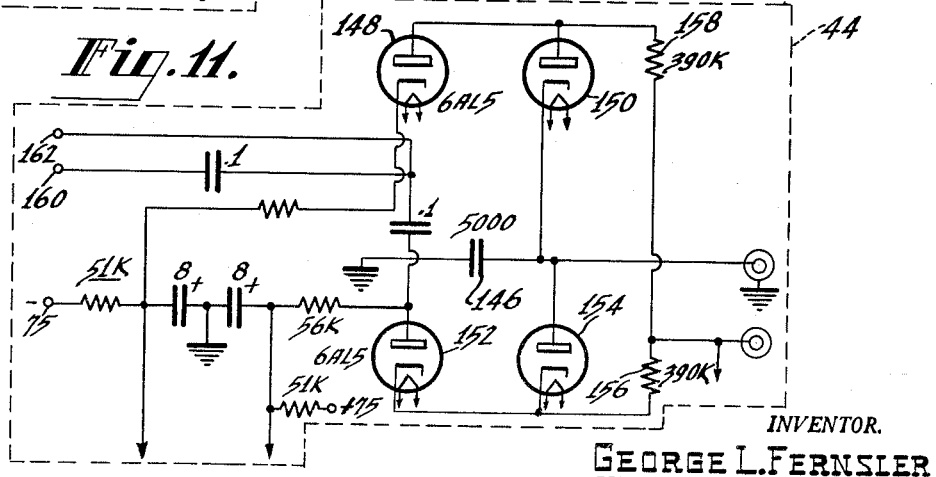

The opposite polarity pulses from the gating univibrator 142 are applied to the memory circuit 44 illustrated schematically in Figure 11. The voltage to be sampled, which is the output signal from the receiver 10, is applied to the memory circuit input terminal 144. The resultant information appearing at the input terminal 144 is stored in a memory capacitor 146 when the memory circuit is triggered by a gating pulse from the gating univibrator 142. The memory circuit includes four diodes 148, 150, 152 and 154. In the quiescent state, two bias voltages, one a negative voltage applied to the cathode of the diode 148 and the other a positive voltage applied to the anode of the diode 152 cause these diodes to conduct. The currents through the diodes 148 and 152 cause a voltage to be developed across the resistors 156 and 158 which is of a polarity to maintain the diodes 150 and 154 non-conducting. When positive and negative pulses are applied respectively to the terminals 160 and 162 from the gating univibrator 142, the diodes 148 and 152 are cut-off, and the input voltage from the receiver 10 under alignment can charge the memory capacitor 146 through the diodes 150 and 154 depending upon the polarity of the input signal. For optimum operation, the contact potentials of the diodes 150 and 154 should be equal. However, good results may be obtained in this respect by reducing the filament voltage of the diodes below the rated value. The charging time constant of the circuit including the memory capacitor 146 is longer than the gating interval so that several cycles are required to bring the capacitor up to full charge. This however, is of no disadvantage as the time constant of the servo loop is much greater than the time constant of the sampling circuit.

The voltage across the memory capacitor 146 is available at an output terminal 164 for application to the switches and hence to the chopping circuit 72 which is shown in Figure 12.

The chopping circuit, as discussed briefly in the general system of Figure 1, is provided for the purpose of converting the gradually varying output voltage from the I.F. amplifier under alignment into a square wave of corresponding amplitude and sense which may be amplified in A.C. coupled amplifiers to control the driving motors 85, 86, 87, 88 and 89. The chopping circuit 72, for example, comprises a vibratory element or armature 166 which is polarized so as to be moved back and forth between the fixed contacts 168 and 170 due to the attraction and repulsion of the magnetic fields set up by an adjacent armature coil 172. The coil 172 is excited with a sinusoidal voltage from a standard frequency voltage source so that the armature 166 is moved back and forth at a rate corresponding to the frequency of the source. The fixed contact 168 is connected to the memory capacitor 146 by way of the output terminal 165 whereas the fixed contact terminal 170 is connected to a terminal for connection with a predetermined reference voltage. The armature 166 is electrically connected to the input circuit of the servo amplifier 80.

During the operation of the chopping circuit 72, as the armature 166 is moved back and forth between the contacts 168 and 170 under the influence of the armature coil 172, it is successively connected to the potentials at which these contacts are operated. Therefore, during periods when the contacts 168 and 170 are not at the same potential, a square wave of voltage is produced having a frequency corresponding to the frequency exciting the armature coil 172. As the receiver 10 is brought into alignment with the reference potentials, the potential existing on the terminal 168 approaches and becomes equal to that on the terminal 170 and therefore no variation in potential exists as the armature 166 moves back and forth between the contacts 168 and 170. Thus there is no output signal for amplification by the servo amplifier to drive the motor.

As also shown in Figure 12, the error signal applied to the A.C. servo amplifier 80 is amplified by a pentode amplifier 174 and coupled to a cathode follower stage 176. The signal coupling circuit between the cathode follower stage 176 and an amplifier stage 178 in the servo amplifier 80 includes a limit switch 180. In the normal operation of the system the limit switch completes the circuit between the cathode follower 176 and the input circuit for the amplifier stage 178. Each servo motor has an offset on the shaft that will operate the limit switches associated with the particular motor at either end of the normal tuning range of the tuning elements of the components 12, 14, 16 and 17. At either limit the switch 180 is actuated to ground the output of the cathode follower stage 176 so that no error signal may be developed to drive the tuning motor 85. This provides a safe-guard to prevent damage to the tuning controls. The output signal from the tachometer generator is also coupled to the input circuit of the amplifier stage 178. The tachometer output signal is summed together with the amplified chopper signal. The amount of tachometer signal used in each loop varies and may be determined experimentally for best operation to provide fast and stable servo loops.

The amplifier stage 178 is coupled to a phase splitter 182 which drives a push-pull output amplifier stage 184. The anodes of the respective tubes in the push-pull output stage 184 are connected respectively to the field winding of the motor 85, to control the position of the motor armature in accordance with the error signal applied to the servo amplifier 80.

The variable gain amplifier 26 which is connected between the sweep frequency generator 24 and the receiver 10 is shown in detail in Figure 13. Signals from the sweep frequency generator 24 are applied to the amplifier input terminal 200. The amplifier comprises two pentode amplifiers 202 and 204 having pi type coupling networks 206 and 208 and a cathode follower output stage 210. The amplifier output terminal 212 is adapted to be connected to the input terminal 114 of the I.F. amplifier shown in Figure 2. The amplifier frequency response is relatively flat from 41 to 48 megacycles to pass the desired signals from the sweep frequency generator 24.

The gain of the amplifier 26 is controlled by the bias applied to the control grids of the two pentode amplifier stages 202 and 204. The bias control network includes a voltage divider including a variable resistor 214 and a resistor 216 connected between ground and the negative terminal of a D.C. power source not shown. The tap on the variable resistor 214 is connected through suitable networks to the control grids of the amplifiers 202 and 204.

As shown in Figure 1, the servo motor 80 controls the gain of the amplifier 26. To this end the variable resistor 214 tap is mechanically coupled to the servo motor for movement thereby. To increase the gain of the amplifier 26, the tap is moved toward the grounded end of the resistor so that a less negative voltage is applied to the control grids of the pentode amplifier stages 202 and 204. Conversely, the gain may be decreased by moving the tap in the opposite direction to apply a more negative voltage to the pentode amplifier stages 202 and 204.

Figure 14:
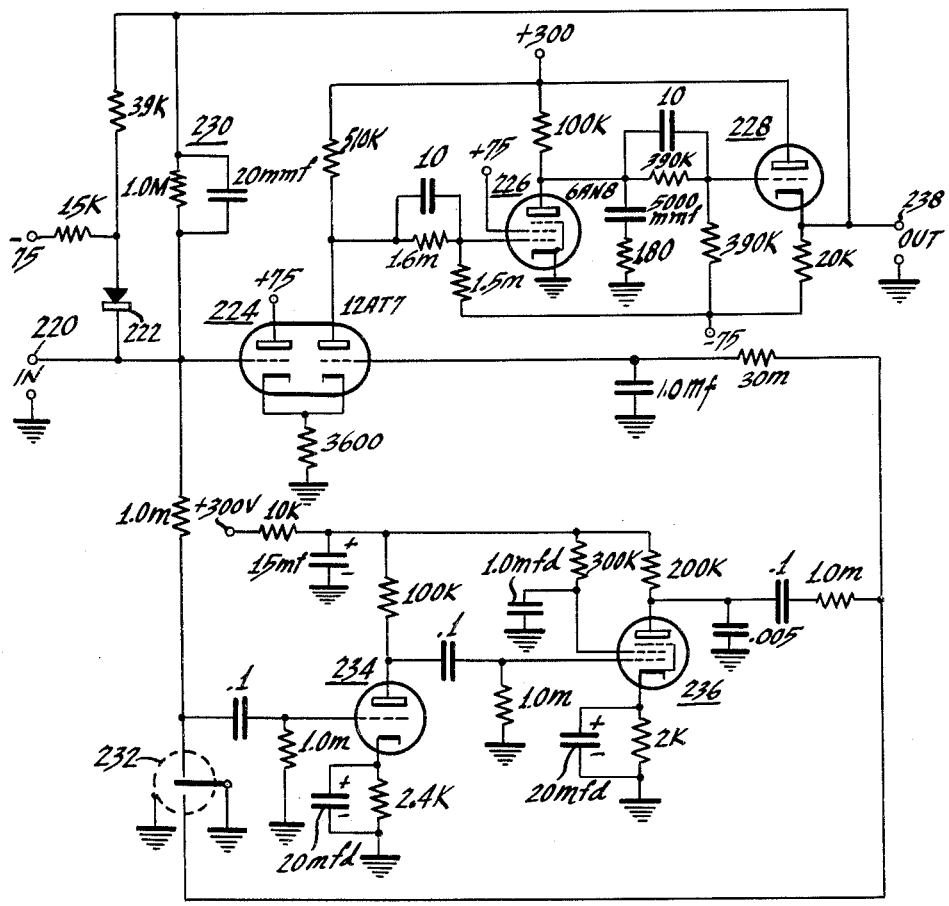

The stabilized D.C. amplifier 51 shown in Figure 14 is used to amplify the output signal from the receiver 10. As shown in Figures 1 and 11 the amplified signal is applied to the video input terminal 144 of the gated memory circuits 44, 45, 46, 47, 48 and 50. Signals from the output terminal 116 (Figure 2) are applied to the amplifier input terminal 220. The amplifier has three stages 224, 226, and 228, the stage 228 being a cathode follower output stage. A feedback circuit from the cathode of the stage 228 to the control grid of the stage 224 stabilizes the amplifier for gain, and includes a limiter 222 to avoid overload during some of the adjustments. An additional stabilizing element is provided to insure that the input and output voltages of the D.C. amplifier have their zero voltages simultaneously. This additional stabilizing network includes a vibrator 232 and an A.C. amplifier including the stages 234 and 236. For a further description of the D.C. amplifier reference may be made to "Stabilization of Wide Band D.C. Amplifiers For Zero and Gain," E. A. Goldberg, RCA Review, June 1950. The amplified output signal from the D.C. amplifier 51 is available at the output terminal 238.

In the operation of the automatic alignment system shown and described in connection with Figures 9 to 14, the apparatus to be aligned is first placed in an alignment fixture. The movable tap of the variable resistor 214 and the tunable elements of the transformer 12, capacitor 14, inductor 16 and transformer 17 are mechanically coupled to the respective servo motors 85, 86, 87, 88 and 89. In the first step of the alignment procedure the clock-controlled motor 70 sets the movable arms of each of the switches 60–69 to the top contact as viewed in Figure 1. The top contact of the switches 60–64 are grounded and the top contacts of the switches 65–69 are connected to a terminal 65a–69a to which a D.C. potential is applied. This provides a constant error signal for each of the five servo loops controlling the variable gain amplifier 26 and the tunable elements 12, 14, 16 and 17 thereby running all the controls to some predetermined mechanical position. This run-out period for the tuning controls may provide a warm-up time for the receiver, and as explained above, Figure 8 represents the response of the composite passive network with the controls in the run-out position.

After the time provided for the above operation has expired, the clock-controlled motor 70 moves the movable arms of the switches 60–69 to the second contact position from the top as viewed in Figure 1. In this position the inductor 16 is tuned. Accordingly, the contacts of the switches 61, 62, 64, 66, 67 and 69 are grounded so that the servo loops which control the tuning of the transformer 12, capacitor 14 and transformer 17 are deenergized. The selected contact of the switch 63 is connected to the gated memory 50 which stores a signal representative of the receiver output at 46.25 megacycles. The selected contact of the switch 68 is connected to a terminal 68b to which is applied a reference potential corresponding to the desired output of the overcoupled stage at 46.25 megacycles.

The switches 60 and 65 which are connected in the servo loop for controlling the variable gain amplifier 26 are connected to apply a voltage from the gated memory 48 which indicates the response of the receiver 10 at 45.75 megacycles, and a voltage applied to the terminal 65b which represents the desired output level of the overcoupled stage at 45.75 megacycles to the separate contacts of the chopping circuit 72. As the sweep frequency generator 24 approaches the frequency to which the tuner 32 is tuned (45.75 megacycles), a pulse is produced which keys the gate pulse generator 40. The gate pulse generator 40 in turn triggers the gated memory circuit 48 for a predetermined time period to receive information from the receiver under alignment. This response is stored as a charge on the memory capacitor provided in the memory circuit, and is applied to one of the fixed terminals of the chopping circuit 72 by way of the switch 60. The reference potential representative of the desired output level of the receiver at 45.75 megacycles is applied to the other fixed contact terminal of the chopping circuit 72 by way of the switch 65. When the output level of the receiver under alignment differs from the predetermined reference potential, the potential on the fixed contact terminals of the chopping circuit 72 will be different. Accordingly, an error voltage is developed by the chopping circuit 72 which is amplified in the servo amplifier 80 to drive the motor 85. The motor 85 drives the tap on the resistor 214 as shown in Figure 13 to adjust the sweep signal applied to the receiver under alignment in a direction to maintain the amplitude of the output signal therefrom constant at the level proportional to the reference potential applied to the terminal 65b. The time constant of this servo loop is fixed relative to the other servo loops to insure that the signal output amplitude at 45.75 megacycles is constant.

As the sweep frequency generator cyclically continues over the frequency range and approaches the frequency at which the tuner 34 is tuned (46.25 megacycles) a pulse is produced which is applied to the gate pulse generator 42. In the meantime the gating pulse from the generator 40 to the memory circuit 48 has expired so that information from the receiver no longer affects this circuit. The gate pulse generator 42 produces a gating pulse to trigger the memory circuit 50 to receive information from the receiver 10 in response to the 46.25 megacycle input signal. Any difference in the response of the receiver 10 from the reference potential applied to the terminal 68b is utilized to produce an error signal by means of the chopping circuit 76, which error signal is amplified by the servo amplifier 83 to drive the servo motor 88. This adjusts the tuning of the inductor 16 in a direction to bring the frequency response of the overcoupled network to the characteristic as indicated in Figure 7.

The selection of the sampling frequencies as noted above is not critical. However, it is desirable to select a sampling frequency for the servo loop of any of the tuning elements at which the tuning of that particular element has a substantial effect. Hence, in the tuning of the inductor 16, a sampling frequency of 46.25 megacycles was used. It can be noted by comparing the graphs of Figures 7 and 8, that the principle effect of detuning and conversely of tuning the inductor 16 was in the vicinity of 46.25 megacycles.

The selection of the sampling frequency for controlling the variable gain amplifier, renders somewhat of a different problem. In this case it was found desirable to select a frequency at which minimum effect was observed during the detuning procedure. Again by comparison of the graphs of Figures 7 and 8, it can be seen that the minimum effect of detuning the inductor 16 where there is an appreciable response, occurs in the vicinity of 45.75 megacycles. Accordingly, this frequency was selected for controlling the variable gain amplifier 26. The sampling frequencies for controlling the succeeding steps were selected in a similar manner.

After the time assigned for the completion of this step has expired, the clock-controlled motor 70 operates to move the switches 60-69 to the third contact from the top as viewed in Figure 1. In this step the transformer 17 is tuned. The selected contact of the switches 61, 62, 63, 66, 67 and 68 are grounded so that the servo loops for controlling the transformer 12, capacitor 14 and inductor 16 are de-energized.

The selected contact of the switch 60 is connected to the gated memory 50 which stores the output of the receiver 10 at 46.25 megacycles, and a selected contact of the switch 65 is connected with the terminal 65c at which a D.C. reference potential is applied. The reference potential applied to the terminal 65c corresponds to a desired output level of the receiver 10 at 46.25 megacycles. The stored output of the receiver 10 in the memory 50 and the reference potential are applied respectively to the stationary contact terminals of the chopping circuit 72, and any difference therebetween produces an error signal for automatically adjusting the gain of the variable gain amplifier 26.

In a similar manner the chopping circuit 78 is connected through the switch 64 to the output of the gated memory 45 which stores the voltage corresponding to the output level of the receiver 10 at 43.25 megacycles. The other terminal of the chopping circuit 78 is connected through the switch 69 to the terminal 69c. A reference potential is applied to the terminal 69c which corresponds to the desired relative output of the overcoupled stage at 43.25 megacycles as viewed in Figure 6. Any difference in potential existing on the stationary terminals of the chopping circuit 78 produces an error voltage which controls the tuning of the transformer 17 by way of the servo motor 89 in a direction to minimize the error signal. When the transformer 17 is completely adjusted, the frequency response of the overcoupled circuit corresponds to that shown in Figure 6 of the drawings.

After the transformer 17 has been tuned, the clock-controlled motor 70 moves the switches 60-69 to the fourth position from the top as viewed in Figure 1. In this position the transformer 12 is tuned in a manner similar to that described above in connection with the tuning of the transformer 17 and the inductor 16. In this switch position the contacts of the switches in the servo loops for tuning the capacitor 14, inductor 16 and the transformer 17 are grounded. The variable gain amplifier is controlled by comparing the response of the receiver at 45.75 megacycles as stored in the gated memory 48 with a reference potential applied to the terminal 65d. As mentioned above, this reference potential corresponds to the desired output of the overcoupled stage at 45.75 megacycles with only the capacitor 14 detuned. The actual control of the tuning element 13 of the transformer 12 is effected by comparing the response of the receiver at 43.25 megacycles as stored in the memory circuit 45 with a fixed reference potential applied to the terminal 66d. This reference potential corresponds to the desired output of the overcoupled stage at 43.25 megacycles with only the capacitor 14 detuned.

After completion of the tuning of the transformer 12, the clock-controlled motor 70 causes the switches 60-69 to move to the fifth position for tuning the capacitor 14. In this position the servo loops for tuning the transformer 12, the inductor 16 and the transformer 17 are deenergized, and the variable gain amplifier 26 in this position is controlled by comparing the response of the receiver at 44.75 megacycles as stored in the gated memory 47 with an appropriate reference potential applied to the terminal 65e. Also, the tuning of the capacitor 14 is controlled by comparing the response of the receiver at 41.6 megacycles as stored on the gated memory 44 with a reference potential applied to the terminal 67e. The control of the variable gain amplifier 26 and the tuning of the capacitor 14 is similar to that described above. Upon completion of the tuning of the capacitor 14 the response of the overcoupled circuit is that shown in Figure 4 of the drawing.

It can be seen that the frequency response as indicated in Figure 4 does not correspond with the desired frequency response for the overcoupled circuit as indicated in Figure 3. Accordingly the servo loops for tuning the transformer 12, the capacitor 14 and the transformer 17 are effectively energized to touch-up the overall tuning to exactly meet the desired specification. In this step of the procedure the clock-controlled motor 70 moves the switches 60-69 to the bottom contact as viewed in Figure 1. In this step the servo loop for controlling the inductor 16 is deenergized. At this point it should be noted that an automatic alignment apparatus may be designed which uses fewer control motors than those illustrated in Figure 1, and the motors may be selectively connected to perform more than one function.

In the final position the gain of the variable gain amplifier 26 is controlled by comparing the response of the receiver at 44.6 megacycles as stored in the gated memory 46 with a reference potential applied to a terminal 65f. These potentials as described above are applied by way of switches 60 and 65 to the chopping circuit 72. Any difference between the magnitude of these signals may be used to produce an error voltage for adjusting the gain of the amplifier 26 so that the overall gain of the signal channel including the amplifier 26, the receiver 10 and the D.C. amplifier 51 remains constant at 44.6 megacycles. In a manner similar to that described, the tuning of the transformer 12 is controlled by comparing the response of the overcoupled stage at 43.25 megacycles as stored in the gated memory 45 with a reference potential applied to the terminal 66f. The tuning of the capacitor 14 is controlled by comparing the response of the overcoupled stage at 41.6 megacycles as stored on the gated memory 44 with a reference potential applied to the terminal 67f. Finally the tuning of the transformer 17 is controlled by comparing the response of the overcoupled stage at 45.75 megacycles as stored on the gated memory 48 with a reference potential applied to the terminal 69f.

The error signals produced as a result of a comparison of the aforementioned voltages operate to simultaneously tune the transformer 12, the capacitor 14 and the transformer 17 in a manner to achieve the frequency response characteristic illustrated in Figure 3.

The automatic alignment system of this invention quickly and accurately operates to align tuned circuits of a composite passive network to a predetermined frequency response characteristic by comparing the response of the network under alignment with predetermined reference potentials. The criterion by which the tuning controls are controlled in the step by step tuning procedure may be obtained by observing the change in the frequency response of the network after various tuning controls are successively detuned to some extreme condition. Thus to align a completely detuned network, a procedure may be established which obtains the specific response characteristics which were observed by tuning the respective tuning controls in the reverse order than that which they were detuned.

What is claimed is:

1. An automatic alignment system for aligning a composite passive network comprising a plurality of tunable circuit elements to a predetermined frequency response characteristic comprising, means for sequentially energizing said network at different signal frequencies in the desired passband of said network, means providing a first reference potential representative of the desired response of said network at a first selected frequency with only a first of said tunable circuit elements properly tuned, means comparing a response of said network at said first selected frequency with said reference potential to derive a first error signal, first automatic control circuit means responsive to said first error signal for adjusting the tuning of said first tunable circuit element, means providing a second reference potential representative of the desired response of said network at a second selected frequency with only a first and second of said tunable circuit elements properly tuned, means comparing the response of said network at said second selected frequency with said second reference potential to derive a second error signal, second automatic control circuit means responsive to said second error signal for adjusting the tuning of said second tunable circuit element, and automatic switching means for sequentially energizing said first and second control circuit means and subsequently simultaneously energizing said first and second control means.

2. An automatic alignment system for aligning a composite passive network comprising a plurality of tunable circuit elements to a predetermined frequency response characteristic comprising, means providing a signal channel including said network, gain control means for adjusting the gain of said signal channel, means for sequentially energizing said signal channel at different signal frequencies in the desired passband of said network, means providing a first reference potential representative of the desired response of said network at a first selected signal frequency with only a first of said tunable circuit elements properly tuned, the tuning of said first tunable circuit element having a substantial effect at said first signal frequency, means comparing a response of said network at said first selected signal frequency with said reference potential to derive a first error signal, first automatic control circuit means responsive to said first error signal for adjusting the tuning of said first tunable circuit element, second automatic control circuit means for said gain control means to maintain constant signal output from said signal channel at a second selected signal frequency during the tuning of said first tunable circuit element, means providing a second reference potential representative of the desired response of said network at a third selected signal frequency with only a first and second of said tunable circuit elements properly tuned, the tuning of said second tunable circuit element having a substantial effect at said second signal frequency, means comparing the response of said network at said third selected signal frequency with said second reference potential to derive a second error signal, third automatic control circuit means responsive to said second error signal for adjusting the tuning of said second tunable circuit element, and fourth automatic control circuit means for said gain control means to maintain constant signal amplitude output from said signal channel at a fourth selected signal frequency during the tuning of said second tunable circuit element.

References Cited in the file of this patent

UNITED STATES PATENTS

| 2,252,058 | Bond | Aug. 12, 1941 |
|---|---|---|
| 2,376,667 | Cunningham | May 22, 1945 |
| 2,465,531 | Green | Mar. 29, 1949 |
| 2,468,350 | Sunstein | Apr. 26, 1949 |
| 2,505,511 | Vogel | Apr. 25, 1950 |
| 2,719,270 | Ketchledge | Sept. 27, 1955 |
| 2,727,994 | Enslen | Dec. 20, 1955 |
| 2,753,526 | Ketchledge | July 3, 1956 |
| 2,843,747 | Ashley | July 15, 1958 |